United States Patent [19]
Heyrman et al.

[11] Patent Number: 4,782,779
[45] Date of Patent: Nov. 8, 1988

[54] BARGE LATTICE SKEGS

[75] Inventors: Jacques Heyrman; Josip Gruzling, both of North Vancouver, Canada

[73] Assignee: Seatronics Technologies Ltd., Canada

[21] Appl. No.: 4,760

[22] Filed: Jan. 7, 1987

Related U.S. Application Data

[63] Continuation of Ser. No. 689,742, Jan. 8, 1985, abandoned, which is a continuation-in-part of Ser. No. 91,254, Nov. 5, 1979, Pat. No. 4,569,302, which is a continuation of Ser. No. 870,034, Jan. 16, 1978, Pat. No. 4,217,844, which is a continuation of Ser. No. 802,140, May 31, 1977, abandoned, which is a continuation of Ser. No. 688,014, May 19, 1976, abandoned.

[51] Int. Cl.$^4$ .............................................. B63B 1/00
[52] U.S. Cl. ...................... 114/63; 114/129; 114/163
[58] Field of Search ............ 114/25, 56, 57, 63, 114/65 R, 129, 144 R, 149, 152, 163-164, 274-279

[56] References Cited

U.S. PATENT DOCUMENTS 3,934,531 1/1976 Allen .................................. 114/63
4,217,844 8/1980 Gruzling ............................. 114/163

FOREIGN PATENT DOCUMENTS 105182 9/1938 Australia .............................. 114/274

Primary Examiner—Joseph F. Peters, Jr.
Assistant Examiner—Jesús D. Sotelo
Attorney, Agent, or Firm—Robert W. Beach; Ward Brown

[57] ABSTRACT

A skeg unit mounted on a raked barge stern counter is a box lattice structure including an athwartships row of upright generally parallel vanes having their upper ends connected by an athwartships upper horizontal tie plate and their lower ends connected by a horizontal lower tie plate. The box lattice structure is mounted to the barge stern counter by struts spaced athwartships of the barge of a length to locate the upper tie plate below the loaded waterline of the barge. The vanes are of airfoil cross section and the outboard vanes are toed out. The horizontal tie plates are of airfoil cross section and have negative angles of incidence, the negative angle of incidence of the upper tie plate being greater than the negative angle of incidence of the lower tie plate.

20 Claims, 4 Drawing Sheets

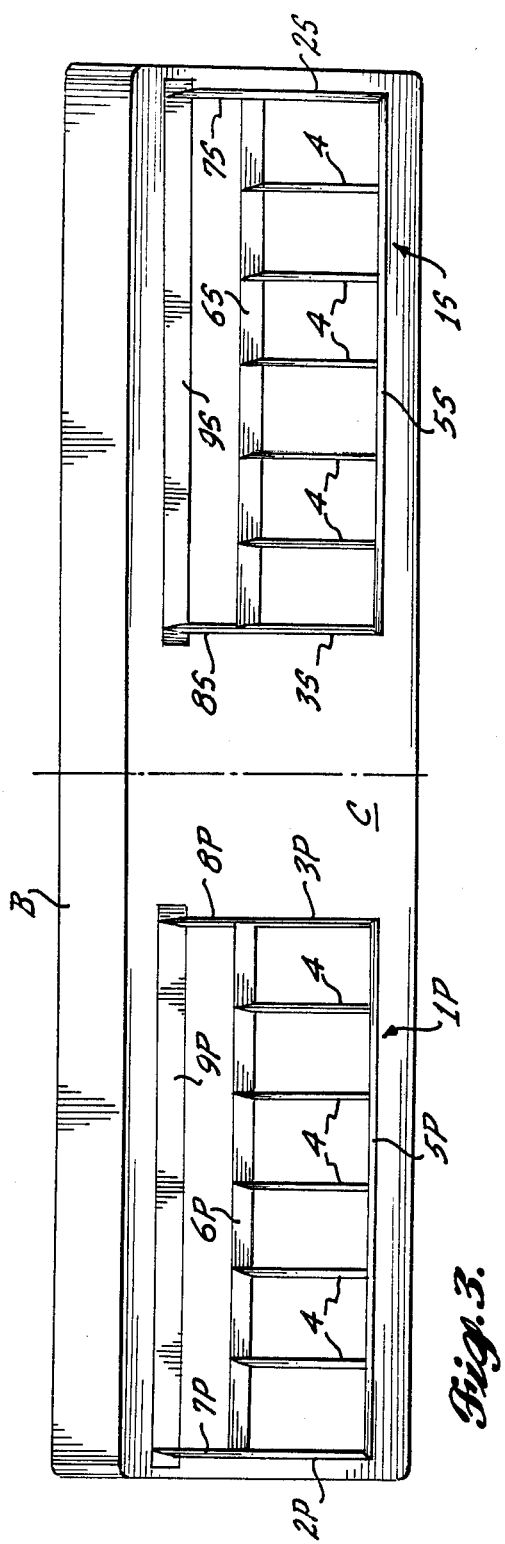
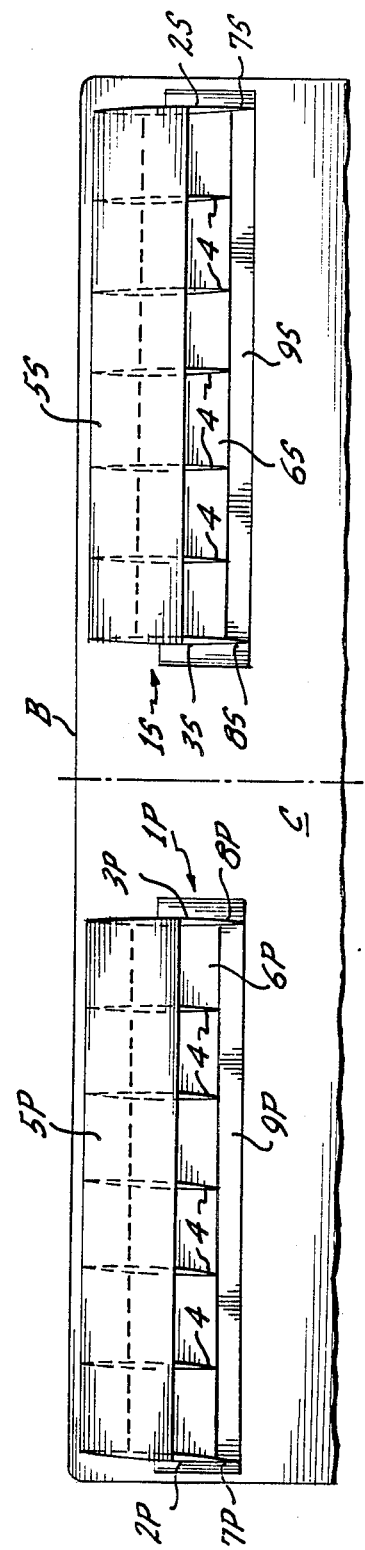
Fig. 3.
Fig. 4.

BARGE LATTICE SKEGS

CROSS REFERENCE

This application is a continuation of co-pending application Ser. No. 689,742, filed on Jan. 8, 1985, now abandoned, which is a continuation-in-part of application Ser. No. 091,254 filed Nov. 5, 1979, now U.S. Pat. No. 4,569,302, which was a continuation of application Ser. No. 870,034 filed Jan. 16, 1978 resulting in U.S. Pat. No. 4,217,844 which was a continuation of application Ser. No. 802,140 filed May 31, 1977, now abandoned, which was a continuation of application Ser. No. 688,014 filed May 19, 1976, now abandoned.

BACKGROUND OF THE INVENTION

1. Field of the Invention

This invention relates to barge skegs of a box lattice type for deterring yawing to stabilize directional travel of barges.

2. Prior Art

The lattice box skegs of the present invention constitute an improvement on the skegs shown in FIGS. 6 to 9, inclusive of U.S. Pat. No. 4,217,844, issued Aug. 19, 1980, for Barge Dagger Skegs.

SUMMARY OF THE INVENTION

A principal object of the invention is to reduce the drag or resistance to travel of a barge having a nonpowered, nonsteered hull designed for towing by a towline trailing a towboat, particularly when loaded, even more than the resistance is reduced by the skeg structure disclosed in U.S. Pat. No. 4,217,844.

Another object is to provide a barge skeg structure of rugged character which is economical to manufacture and is well suited to factory production as distinguished from a skeg structure to be custom assembled on a barge.

Another object is to provide a skeg structure that can be produced in stock units which can be applied to barges having stern counters of different configuration and of different degrees of rake.

A further object is to provide a skeg structure that is less subject to possible damage by floating debris.

It is also an object to provide a skeg construction composed largely of similar parts and in which a damaged part can be replaced comparatively easily and quickly.

The foregoing objects can be accomplished by a skeg structure of box lattice type composed of substantially parallel upright vanes arranged in a row transversly of the direction of travel of the barge and having their lower and upper ends, respectively, connected by horizontal generally parallel tie plates arranged edgewise to the direction of travel of the barge. The assembly is suspended from the aft portion of a barge counter by a plurality of struts spaced transversly of the barge.

BRIEF DESCRIPTION OF THE DRAWINGS

FIG. 3 is a rear elevation of a barge equipped with the skeg structure of the present invention, and FIG. 4 is a bottom plan of the stern portion of such barge.

DETAILED DESCRIPTION

Like the skeg structure shown in U.S. Pat. No. 4,217,844 the skeg structure of the present invention is applied to barges having a nonpowered, nonsteered hull designed for towing by a towline trailing a towboat. The new skegs differ from skegs conventionally used on barges by incorporating upright vanes of high aspect ratio arranged with their lengths upright and disposed edgewise to the direction of barge movement.

Figure 1:
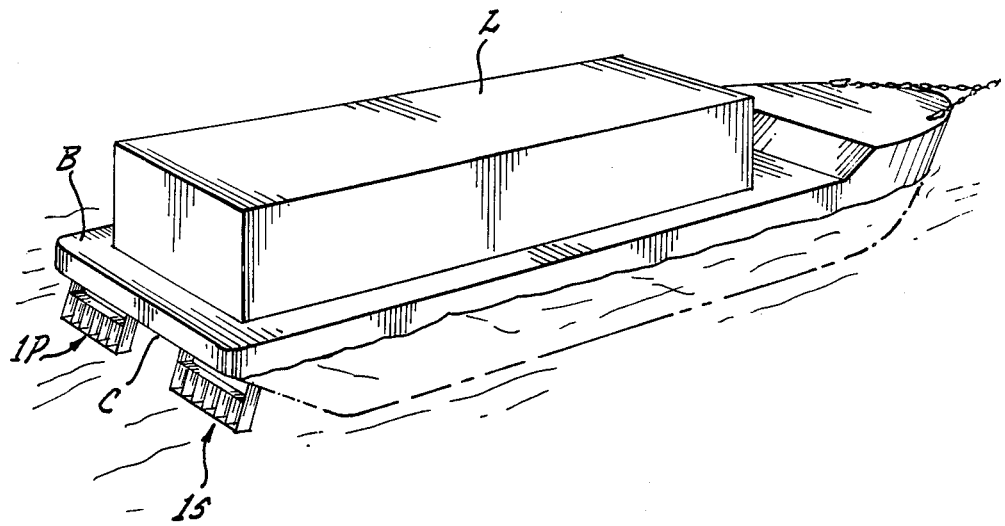
FIG. 1 is a top perspective of a loaded barge equipped with skegs according to the present invention projecting downward from the barge stern counter.

FIG. 1 shows a representative barge B having a flat bottom with two box lattice skeg units attached to its raked stern counter C. The units include a port skeg unit 1P and a starboard skeg unit 1S attached to the barge counter at opposite sides, respectively, of the longitudinal vertical central plane of the barge.

Figure 2:
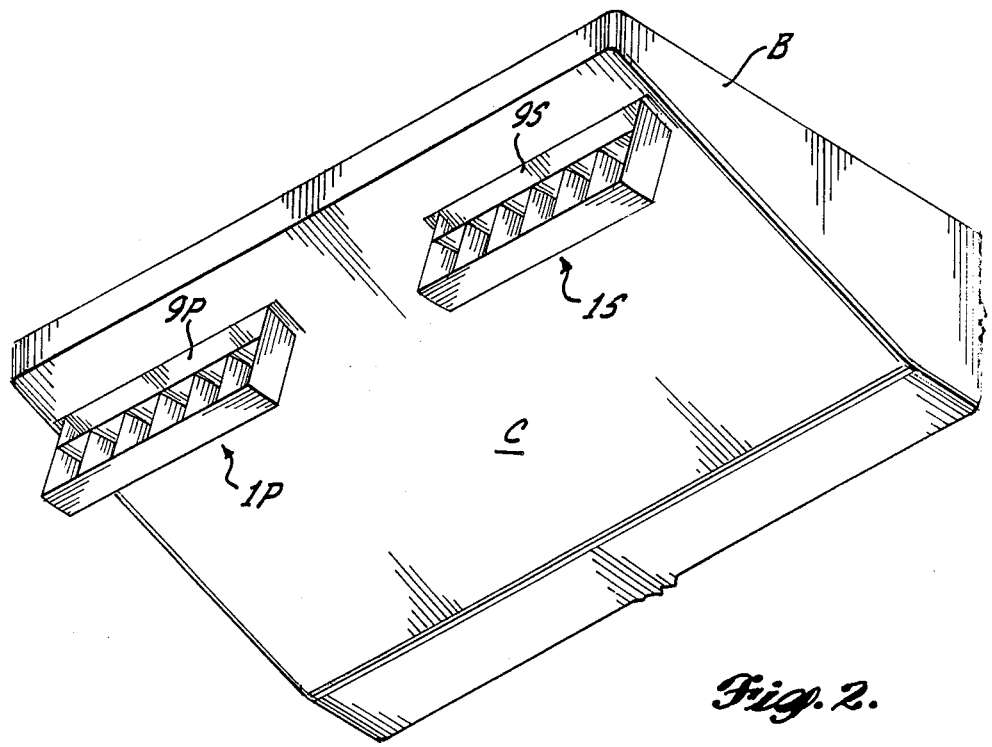
FIG. 2 is a bottom perspective of the stern portion of a barge showing the skeg structure.

The details of the skeg units are shown better in FIGS. 3, 4, 5 and 6 than in FIGS. 1 and 2. The two skeg units 1P and 1S incorporate outboard end vanes 2P and 2S, respectively, and inboard end vanes 3P and 3S, respectively. Between such inboard vanes and outboard end vanes are arranged fine intermediate vanes 4 disposed edgewise to the path of travel of the barge B. The intermediate vanes are generally parallel to each other and to the inboard and outboard vanes.

The lower ends of all the vanes in each unit are connected by a lower horizontal tie plate 5P in the port unit and 5S in the starboard unit. The upper ends of the vanes in each unit are connected by an upper substantially horizontal tie plate 6P for the port unit and 6S for the starboard unit. The combination of the end vanes, the intermediate vanes 4 and the upper and lower tie plates in each unit forms the unit as box lattice structure having bays between adjacent upright vanes.

The box lattice structure of each skeg unit is attached to the barge stern counter C by a plurality of upright struts spaced transversely of the barge, fewer than the number of vanes in the skeg unit. The port unit 1P is shown attached to the barge counter by two struts an outboard strut 7P and an inboard strut 8P connected to the opposite ends respectively of the box lattice structure. Such struts are preferably coplanar, respectively, with the port outboard end vane 2P and the inboard vane 3P. Since there are two struts and seven vanes in each unit, there are more than three times as many vanes as struts.

The upper ends of the struts 7P and 8P are connected to opposite end portions of a steel bedplate 9P the length of which extends horizontally, transversly of the barge counter C. The starboard lattice box structure is supported by an outboard strut 7S and an inboard strut 8S the upper ends of which are connected to opposite end portions of a similar bedplate 9S in the same manner as discussed in connection with the port skeg unit. In fact, to promote structural integrity, it is highly desirable for each outboard end vane to be integral and structurally continuous with the outboard strut and for the inboard end vane to be integral and structurally continuous with the inboard strut. The composite end vane and strut members are metal, usually steel, and their upper ends are welded to opposite end portions of their steel bedplates. Each bedplate is inset into the skin of the barge counter C so that the outer surface of the bedplate is flush with the outer surface of the counter skin. The bedplate can then be suitably integrated with the framing structure of the barge stern, as well as being edge-welded to the steel skin portion encircling the bedplate.

Figure 5:
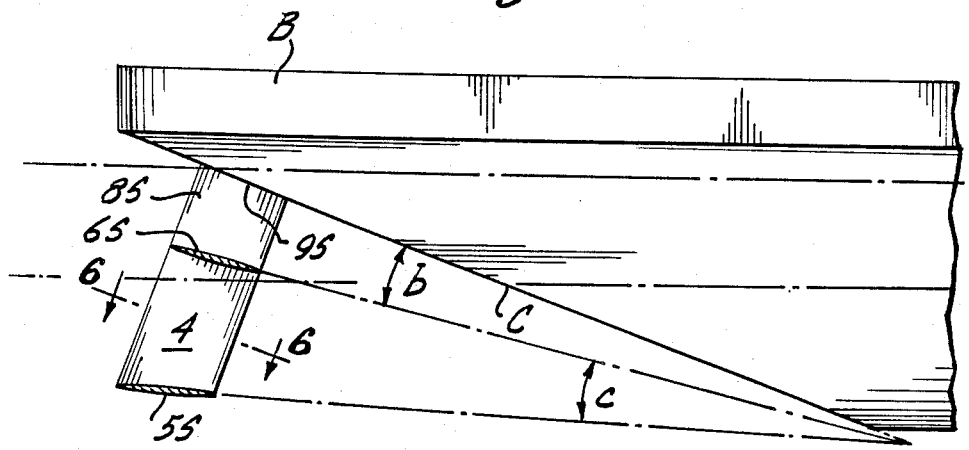
FIG. 5 is a side elevation of the stern portion of a barge equipped with skeg structure of the present invention.

As indicated in FIGS. 3 and 5, the lower and upper horizontal vane-bridging tie plates 5P or 5S and 6P and 6S are integrated with the lower ends and upper ends of the vanes to form a unitary box lattice structure. The vanes and tie plates preferably are of metal so that the ends of the vanes can be welded to the tie plates.

As shown in FIG. 5, each vane 4 has an aspect ratio greater than 1, the vane 4 illustrated in FIG. 5 having an average aspect ratio of approximately 1¼. The aspect ratio can be selected from the range of approximately 1 to 3. Also it is preferred that each intermediate vane 4, as well as the inboard and outboard vanes, be of thin airfoil cross section, although they can be of symmetrical cross section relative to their chords. Also they can be of symmetrical cross section about their spanwise centers.

Figure 6:
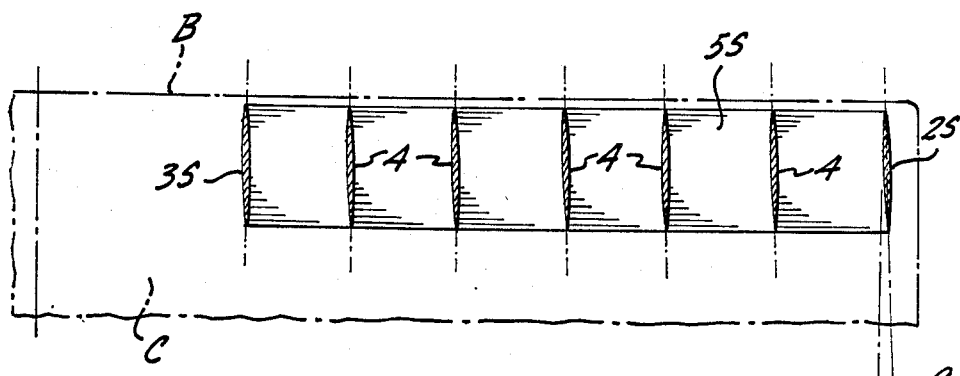
FIG. 6 is a horizontal section through the skeg structure unit taken on line 6—6 of FIG. 5.

Further, while the vanes are generally parallel, it is preferred that the vanes be splayed forwardly, as shown in FIG. 6, to provide venturi passages through the bays of the box skeg structure to reduce the turbulence of the wake. The inboard vanes 3P and 3S should have no angle of incidence, but the angles of incidence of the struts outboard of the inboard vanes should increase progressively for the various vanes of the group.

In the installation shown in FIG. 6 there are six vanes outboard of the inboard vane 3S. The most outboard vane 2S preferably has an angle of incidence with respect to the longitudinal central plane of the barge, indicated as the angle a in FIG. 6, in the range of eight degrees to twelve degrees. The outboard end vane 2S or 2P, may for example, have an angle of incidence of ten degrees, the next inner vane 4 an angle of incidence of eight degrees, the next inboard vane an angle of incidence of six degrees, the next inboard vane an angle of incidence of four degrees, the next inboard vane an angle of incidence of two degrees and the vane 3S closest to the inboard vane an angle of incidence of one degree. If there were more vanes the angle between adjacent vanes would be less for a given angle of incidence of the outermost vane. On the contrary, if fewer vanes were used the angle between adjacent vanes would be greater.

As shown in FIG. 5, it is preferred that the struts and end vanes of each lattice assembly project downward generally perpendicular to the counter C as shown in FIG. 5 instead of vertical. The angle of each vane relative to the vertical could be within the range of 15 to 35 degrees and this angle would depend to a considerable extent on the rake angle of the barge counter C relative to horizontal which could be within the range of 15 degrees to 35 degrees. It is important in every case that the lower horizontal tie 5P or 5S be located somewhat higher than the barge flat bottom, such one-half to one foot (0.15 to 0.30 meters).

The action of the horizontal tie plates 5P, 5S, 6P and 6S contributes substantially to the reduction in turbulence of the barge wake and the drag of the barge hull, and the consequent recovery of energy from the wake. To reduce such turbulence and drag the horizontal tie plates 5P, 5S, 6P and 6S should be of airfoil cross section and may be symmetrical about their chord lines, and further may be symmetrical about a midspan line. In any case it is important that both the upper tie plate and the lower tie plate of each skeg unit have negative incidence angles with respect to horizontal. It is further preferable for the upper tie plate to have a negative angle of incidence greater than the angle of incidence of the lower tie plate but less than the rake angle of the barge stern counter, to provide a forward hydrodynamic reaction.

The negative angle of incidence of the upper tie plate could be within the range of 10 degrees to 15 degrees and the negative angle of incidence of the lower tie plate could be within the range of 2 degrees to 5 degrees. Thus the angle b between the chord of the upper tie plate and the rake of the counter would be a small acute angle and the angle c between the chord of the upper rake and the chord of the lower rake would be a still smaller acute angle. For example, if the rake angle of the barge counter was 20 degrees, the negative angle of incidence of the upper tie plate chord could be 12 degrees, making the angle b 8 degrees, and the angle of incidence of the lower tie plate chord could be 3 degrees, making the angle c 9 degrees.

Usually the span of the upright skeg vanes would not exceed the length of the struts supporting the box lattice skeg structure. Thus the average span of the vanes could be within the range of ½ to ¾ of the distance between the lower tie plate and the barge counter. Typically the average span of the skeg vanes could be 60 percent of the distance between the lower tie plate and the barge counter.

In establishing the location of the upper and lower tie plates four factors should be considered. The first factor is that the lower tie plate should be slightly above the flat bottom of the barge. The second consideration is that the skeg assembly should be located almost as far aft along the barge stern counter as possible without the trailing edge of the lower tie plate projecting rearwardly beyond the stern of the barge when the skeg vanes and struts are inclines downwardly and rearwardly. The third factor is that the vane assembly provide sufficient composite fin area to provide adequate yaw stability for the barge without the upright vanes being located so close together that an undesirable amount of interference is created between the flows past adjacent vanes. The fourth factor for consideration is that the upper tie plate should be located sufficiently low that it is below the surface of the water when the barge is loaded with cargo and is under way, designated L in FIG. 1.

It is preferred that the upper tie plate be sufficiently beneath the surface of the water when the barge is loaded and under way so that floating debris can pass between the struts supporting the skeg assembly and above such upper tie plate to minimize the possibility of floating debris catching on the skeg lattice and being dragged by it to increase the drag on the barge and decrease the effectiveness of the skeg for providing yaw stability for the barge. When the barge is light it is not necessary for the upper tie plate to be submerged because the drag of the barge when under way is less and there is less problem of yaw stability so that yaw stability of the barge can be provided by a smaller amount of effective skeg area.

While it is not essential, it is preferred that the chords of the upright skeg vanes and of the horizontal tie plates all be approximately the same. In particular it is desirable for all of the intermediate skegs 4 to be of the same chord, span and cross section so that they are interchangeable. Such structure enables the components of a lattice skeg unit to be assembled more quickly and efficiently in a plant assembly operation. Moreover, a smaller number of vanes 4 could be provided as spares to enable selected vanes of such an assembly to be replaced in the field if they should become damaged without the necessity of removing the lattice skeg unit in its entirety for repair. Also for various barges the lattice skeg units could be manufactured as stock items with the only variation for custom fitting being the length and angle of the upper portions of the mounting struts.

Figure 7:
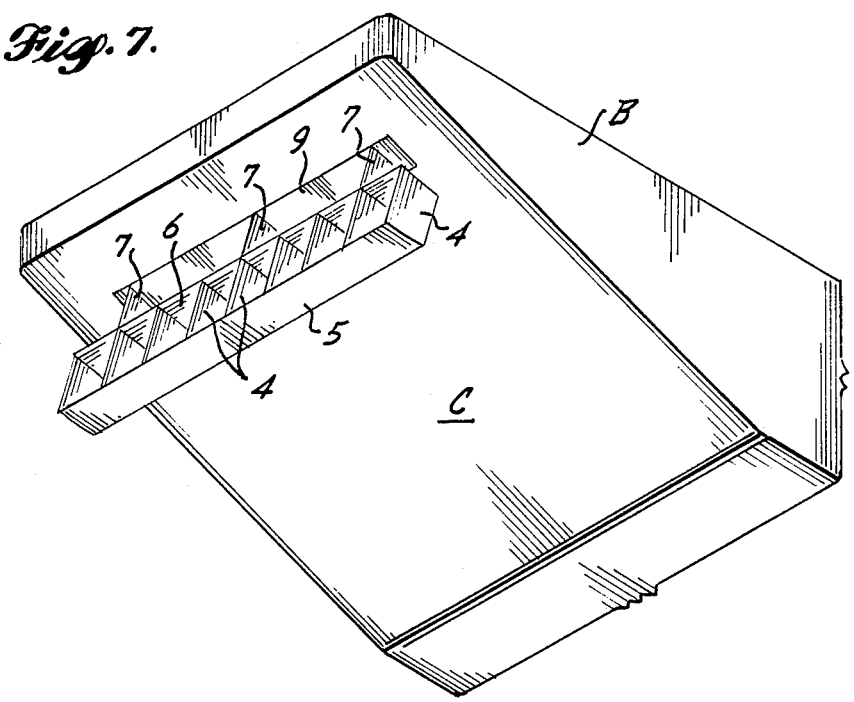
FIG. 7 is a bottom perspective of the stern portion of a barge showing a modified type of skeg structure.
Figure 8:
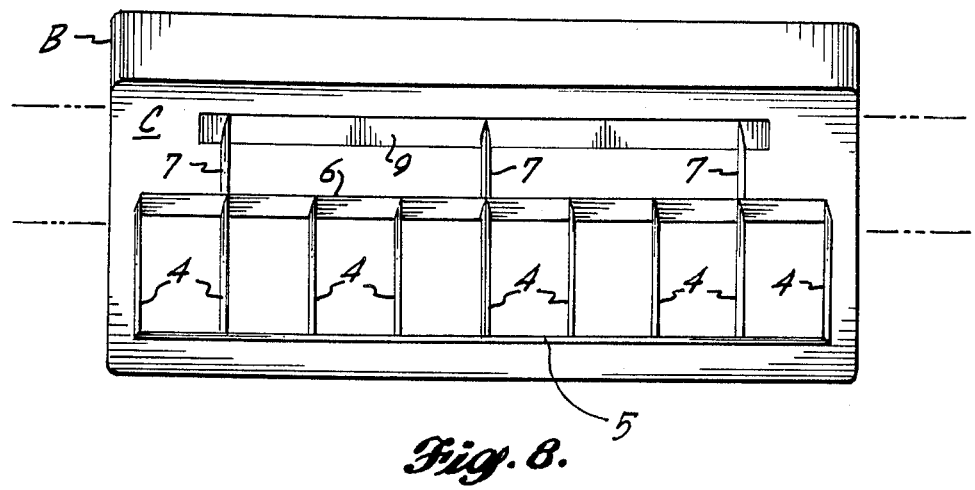
FIG. 8 is a rear elevation of such a barge.

The lattice skeg assembly shown in FIGS. 1 to 6 is provided in two units arranged symmetrically at opposite sides of the longitudinal central vertical plane of the barge. As shown in FIGS. 7 and 8, however, it is feasible, especially for smaller barges, to use only a single lattice skeg assembly. The athwartships length of such an assembly will probably be greater than the length of the individual units where two units are utilized on a barge as shown in FIGS. 1 to 5 inclusive. In the skeg installation shown in FIGS. 7 and 8 the assembly includes nine upright vanes 4 arranged in generally parallel relationship edgewise to the direction of travel of the barge B. The central vane or vanes 4 will be disposed parallel to the longitudinal central plane of the barge and the vanes outboard from the central vane or vanes can be splayed to provide a progressively greater toed out angle of attack for the vanes farther from the longitudinal central plane of the barge as discussed in connection with FIG. 6 above.

The lower ends of the vanes are bridged by a horizontal lower tie plate 5 extending athwartships of the barge and the upper ends of the vanes are bridged by an upper tie plate 6 extending athwartships of the barge. The general construction of the box lattice skeg assembly is similar to the skeg units described above including utilization of vanes and tie plates of airfoil cross section which are of metal with the upper and lower ends of the vanes welded to the tie plates. Both the lower tie plate 5 and upper tie plate 6 have negative angles of incidence, the negative angle of incidence of the upper tie plate 6 being greater than the negative angle of incidence of the lower tie plate 5.

The single box lattice skeg assembly of FIGS. 7 and 8 is supported by three or more struts 7, connecting the upper tie plate 6 and a bedplate 9 integrated with the barge structure and preferably having its outer surface flush with surrounding outer surface of the barge counter skin. Preferably, as shown in FIG. 8, each of the three struts 7 is integral with and in structural continuation of one of the nine vanes 4, with the upper horizontal tie plate 6 being discontinuous and fabricated in sections inserted between the struts 7. In the form shown there are three times as many vanes as struts.

The box lattice skeg unit of FIGS. 7 and 8 has the same advantages as the skeg units described above and operates in the same general manner.

We claim:

1. A barge comprising a nonpowered, nonsteered hull designed for towing by a towline trailing a towboat, said hull having a substantially flat bottom and a raked stern counter, and a box lattice skeg unit projecting downward from the aft portion of said stern counter for effecting yaw stability of said hull, said box lattice skeg unit including an athwartships row of upright vanes, a lower tie plate disposed edgewise generally horizontally higher than the hull bottom and bridging between and connecting lower portions of said vanes and an upper tie plate disposed edgewise generally horizontally and bridging between and connecting upper portions of said vanes, and means mounting said box lattice skeg unit to said barge stern counter with said upper tie plate spaced downward a substantial distance from said barge stern counter.

2. The barge defined in claim 1, in which the upper tie plate has a negative angle of incidence.

3. The barge defined in claim 2, in which the negative angle of incidence of the upper tie plate is less than the rake angle of the barge stern counter.

4. The barge defined in claim 1, in which the lower tie plate has a negative angle of incidence, and the upper tie plate has a negative angle of incidence greater than the negative angle of incidence of the lower tie plate.

5. The barge defined in claim 4, in which the negative angle of incidence of the lower tie plate is within the range of 1 degree to 5 degrees and the negative angle of incidence of the upper tie plate is within the range of 10 degrees to 15 degrees.

6. The barge defined in claim 1, in which vanes are splayed forwardly and a vane closer to the vertical longitudinal central plane of the barge is more nearly parallel to such plane than a vane farther from such plane.

7. The barge defined in claim 6, in which the vane farthest from the vertical longitudinal central plane of the barge is toed out at an angle within the range of 8 degrees to 12 degrees.

8. The barge defined in claim 6, in which a plurality of vanes in a row are toed out forwardly and the toed out angle of each vane is greater than the toed out angle of each vane closer than that vane to the vertical longitudinal central plane of the barge.

9. The barge defined in claim 1, in which the height of the vanes is greater than the distance between the upper tie plate and the barge hull and is greater than the average chords of such vanes.

10. The barge defined in claim 1, in which the box lattice skeg unit is mounted on the barge counter with the vanes inclined downwardly and rearwardly.

11. The barge defined in claim 1, in which the upper tie plate is lower than the loaded waterline of the barge so as to be submerged when the barge is loaded and under way.

12. The barge defined in claim 1, in which the row of vanes includes a plurality of vanes of substantially the same height.

13. The barge defined in claim 12, in which the lower tie plate and the upper tie plate are substantially linear and their lengths are substantially parallel and the vanes interposed between the upper tie plate and the lower tie plate are of substantially equal length.

14. The barge defined in claim 1, in which the vanes are of airfoil cross section.

15. The barge defined in claim 1, in which at least one of the tie plates is of airfoil cross section.

16. The barge defined in claim 1, including two box lattice skeg units mounted on the barge stern counter at opposite sides, respectively, of the vertical longitudinal central plane of the barge.

17. The barge defined in claim 1, in which the vertical longitudinal central plane of the barge substantially bisects the box lattice skeg unit.

18. A skeg unit adapted to be mounted to the raked stern counter of a nonpowered, nonsteered barge hull designed for towing by a towline trailing a towboat with the bottom of the skeg unit higher than the bottom of such barge hull, comprising a row of upright vanes disposed in generally parallel arrangement, said row extending transversely of the chords of said vanes, generally parallel upper and lower tie plates bridging between and connecting portions of said vanes spaced heightwise of said vanes for forming a box lattice skeg unit, and a plurality of mounting struts, fewer than the number of said vanes, extending upward from said upper tie plate and spaced lengthwise thereof for attaching said box lattice skeg unit to the barge hull raked stern counter.

19. The skeg unit defined in claim 18, in which the tie plates are substantially linear and connect opposite end portions, respectively, of the vanes.

20. The skeg unit defined in claim 18, in which the box lattice skeg unit includes at least three times as many vanes as struts.

* * * * *